2,866,701
METHOD OF PURIFYING SILICON AND FERROSILICON

Jerome Strauss, New York, N. Y., assignor to Vanadium Corporation of America, New York, N. Y., a corporation of Delaware No Drawing. Application May 10, 1956
Serial No. 583,950

4 Claims. (Cl. 75—60)

This invention relates to a method of purifying silicon-rich materials such as silicon and ferrosilicon. It relates more particularly to the removal of aluminum and/or calcium from such materials.

In the manufacture of silicon steel sheet and some other special steels of high silicon content, it has frequently been observed that the presence of relatively small amounts of certain elements, particularly aluminum and calcium, has a deleterious effect on the properties of the steels or on the progress of the manufacturing process.

The principal carrier of these impurities has been considered to be ferrosilicon which usually contains between 1 and 1.5% aluminum at the 40–65% Si level and up to 2.50% aluminum at up to 95% Si as well as up to 0.70% calcium in the lower and over 1% calcium in the higher Si ranges.

Thus, in the production of transformer sheets, which may contain from 1.0 to 4.0% silicon, some manufacturers require that the aluminum content of ferrosilicon be below 0.5% and others that the aluminum be below 0.1%. Similarly, in some applications of ferrosilicon, the calcium has been specified to be less than 0.1%.

Also in the production of some aluminum-silicon alloys, calcium is objectionable in commercially pure silicon (of either the 1% or 2% maximum iron types) employed for this purpose.

Furthermore, it is frequently necessary, especially in the production of low-carbon stainless steel, to restrict the carbon content of the ferrosilicon to the lowest possible level.

Impurities in the ferrosilicon or silicon are derived during its manufacture either from the raw materials, such as quartzite or silica rock, carbonaceous reducing agents, such as coke or charcoal, or such auxiliary materials as the electrodes of the smelting furnace, more particularly the ash resulting from the combustion of these electrodes. It has been attempted in the past to meet the desired impurity limits by careful selection of raw materials for ferrosilicon or silicon production. However, this approach has been found prohibitively costly in some cases.

It has, therefore, been attempted to develop methods for removing aluminum and calcium from the finished product or during the course of manufacture. For example, silica flour has been added to molten ferrosilicon as it passed from the smelting furnace into the ladle. This silica does lower calcium and aluminum in the ferrosilicon but not adequately to meet the above-mentioned limits. The reaction, of course, is the oxidation of the aluminum and calcium by the silica, yielding silicon metal and calcium oxide and aluminum oxide, which oxides rise to form a slag and are removed from the metal. However, substantial amounts of silica must be added before any significant portion of the calcium and aluminum are removed, resulting in heat losses and heavy ladle skulls requiring removal and remelting.

Similarly, chlorine has been used, the gas being introduced into molten ferrosilicon or silicon through a tube or lance of suitable refractory materials connected to a suitable source of gaseous or liquid chlorine with the necessary valve equipment for control of the rate of introduction. At the operating temperatures, calcium chloride forms by reaction of the metal with chlorine gas and remains as a molten layer on top of the metal in the ladle. The aluminum chloride escapes from the metal as a gas together with silicon chlorides which also form.

This method has some serious shortcomings. While aluminum and calcium are converted to chlorides, a substantial amount of the silicon of the ferrosilicon or of the pure silicon is also converted to chloride and is lost. As an excess volume of chlorine is required to insure that the reaction shall go reasonably to completion and as the reactions are relatively slow, considerable heat is extracted by the process and lost by convection and radiation from the ladle or other container.

The nuisance from gaseous chlorine in the shop is such that in most instances the treatment is performed outside the shop which in cold weather causes additional heat loss. Thus, it may easily occur, particularly with the higher silicon alloys, that a considerable amount of metal freezes; in other words, skulling is very heavy. Moreover, the control by means of chlorine offers some difficulties and the resultant product varies considerably in aluminum and calcium.

An additional deficiency of the purification by means of chlorine gas lies in the fact that the calcium chloride, which should rise to the surface of the molten metal, apparently does not do so completely and there are small inclusions of this compound remaining in the metal after pouring and solidification; the result is that on storage, the exposed calcium chloride picks up moisture from the atmosphere, becomes sticky and on this account highly objectionable inasmuch as its addition to molten metal is dangerous.

I have discovered that these objections to prior methods can be overcome by using a different agent to combine with and remove aluminum and calcium from molten ferrosilicon. Gaseous carbon dioxide can be effectively employed to oxidize the aluminum and calcium to form slag-making components which rise to the surface and are readily separated. The gas does so quickly and under such conditions as to permit effective control while reducing the aluminum and calcium to very low limits and not causing any substantial loss of silicon by reaction.

A typical example is here presented to illustrate the effectiveness of this method. 4,486 lbs. of molten ferrosilicon containing 47.0% silicon, 50% iron, 1.32% aluminium, and 0.15% calcium were treated in the ladle by the injection of 57 lbs. of carbon dioxide gas at an average feed rate of 1.21 lbs. of carbon dioxide per minute. This treatment resulted in a lowering of the aluminum to 0.22% and of the calcium to 0.02%. The silicon in the metal increased to 48.3% and the iron to 50.2%. Thus, 83.3% of the aluminum and 87% of the calcium were removed, and there is no apparent loss of silicon, allowing for some divergency in sampling and analysis.

The carbon dioxide is introduced into the bath by means of a tube or lance injecting the gas as a constant stream into the metal in the ladle. The lance may be made of graphite, mullite, or other suitable materials of construction. Alternatively, the gas can be introduced through a porous refractory plug or it can be added to the metal by the decomposition of chemical compounds, either placed in the ladle prior to tapping or immersed in the molten ferrosilicon after tapping. Such chemical compounds can be, for example, calcium carbonate (i. e., limestone) or magnesium-calcium carbonate (i. e., dolomite), other alkali carbonates or oxalic acid.

An important advantage of the process is that the waste products of the reaction do not remain as contaminants of the metal, the carbon being rejected by the ferrosilicon or silicon and the calcium and aluminum oxides forming a low melting slag. If desired, alumina or lime may be introduced with the gases to control this slag composition and insure a low melting point.

It is possible to effectively treat a wide range of ferrrosilicon alloys by this means, e. eg., alloys containing from about 40% silicon up to and including commercially pure silicon of low iron content. Commercially pure silicon usually contains between 97 and 98% silicon, a maximum of 1% iron being specified (Minerals Yearbook, volume 1, 1953, Bureau of Mines). However, especially when treating material of very high silicon content, any substantial temperature drop due to the treating gases should be avoided.

The reaction of aluminum and calcium with carbon dioxide at the temperature required for this process is exothermic. However, bottled carbon dioxide, when this form is used is supplied at slightly over 800 pounds per square inch pressure and as this pressure is released and the gas expands, a considerable chilling effect results. Therefore, I generally release the gas into a large volume container or dashpot before I supply it to the lance under light positive pressure at room temperature. The gas thus introduced into the molten metal does not materially affect the temperature of the molten ferrosilicon.

Another method of dealing with the problem of releasing $CO_2$ gas from a cylinder containing it in either solid or liquid form is to pass it through a heated tube or over an electrical heater enclosed within a tube or other suitable apparatus or container. By this means, the gas entering the metal will be either at room temperature or some higher temperature, depending upon the procedure employed. In either case, there is advantage in reducing or completely eliminating possible loss of metal due to skulling.

Other means may alternatively be employed to counteract the chilling effect. For instance, I have added limited amounts of oxygen or suitable oxides along with the carbon dioxide either simultaneously or separately in order to increase the rate of reaction and decrease the time of treatment, thereby avoiding a part of the heat losses. The most satisfactory oxides in the treatment of ferrosilicon are the iron oxides. Moreover, the heat of formation of carbon monoxide is substantially lower than that of carbon dioxide so that its decomposition extracts less heat from the molten metal than does decomposition of the carbon dioxide treating agent; hence, CO may be used either alone or in admixture with $CO_2$ and other oxidizing substances herein mentioned for a part or all of the treatment time, provided that at least 50% of the oxygen is supplied by carbon dioxide.

Under suitable conditions, combustion gases, such as result from the burning of kerosene or other liquid hydrocarbon or petroleum products, natural, water or city gas, coke, etc., may be employed in view of the fact that these combustion gases contain large amounts of carbon dioxide and carbon monoxide, as well as water vapor; nitrogen is, of course, present but it is merely a diluent and at the temperatures involved will not exert any deleterious effect during the course of the process.

While the use of steam presents the possibility of some absorption of hydrogen which in certain uses of the silicon products is objectionable, suitably small proportions of steam in combination with one or more of the oxides of carbon can be employed and offers the advantage of introducing gases at moderately high temperatures.

Introduction of oxygen, oxygen-enriched air or air alone into a molten mass of ferrosilicon has been found to be unsatisfactory. Although calcium and aluminum are largely oxidized, silicon is attacked almost simultaneously and lost, setting free a large amount of heat, and some difficulties are encountered in controlling the reaction. For these reasons, as hereinbefore noted, where oxygen or oxides are used together with carbon dioxide in my process, quantities of these oxidizing agents are limited and will only amount to a small percentage, the major proportion of the oxygen being supplied in the form of carbon dioxide.

I have found that the treatment of silicon or ferrosilicon with carbon dioxide or with mixtures of carbon dioxide and carbon monoxide or solid oxides as hereinbefore described results not only in the removal of calcium and aluminum by oxidation and the elimination of the carbon formed in the reaction but also in the removal of carbon initially present. This is important because in many instances a small percentage of carbon is present in ferrosilicon and silicon either in the combined form or as free particles of carbon such as graphite. For some applications of ferrosilicon, such small amounts of carbon are objectionable. In several lots of 48% ferrosilicon treated according to my invention, the carbon has been reduced, simultaneously with oxidation of calcium and aluminum, from about 0.06 to 0.10% down to under 0.03%.

It is important to note that one of the advantages of using carbon dioxide, with or without carbon monoxide, as an oxidant for the treatment of silicon-rich alloys is that the residue of carbon is rejected by these alloys or by silicon and, therefore, no contamination of the melt by carbon results. Ferrosilicon and silicon produced by carbon reduction normally contain about 0.10% carbon or slightly less. The removal of carbon down to the very low limits described above was a completely unexpected result of this process. It may very well be due to the combined effect of the high silicon content and the movement of the gas through the molten metal resulting in practically complete elimination of the carbon.

When removing aluminum and calcium from silicon-rich alloys by an oxidation reaction, the oxides will associate themselves to form a slag. In some proportions, these calcium aluminates have relatively low melting points and will actually produce a satisfactory protective slag covering. If the proportions are such that this condition does not obtain, very small amounts of alkali metal compounds, such as soda ash or sodium hydrate, may be added; the amount, however, should be such as to just create the desired fluidity if this is indicated and not enough to cause attack on the lining of the ladle or other container. If, on the other hand, conditions of operation are such as to require a non-fluid slag on top of the molten metal, lime may be added to stiffen the slag layer.

The invention is not limited to the preferred embodiment but may be otherwise embodied or practiced within the scope of the following claims.

I claim:

1. The method of removing aluminum and calcium from silicon-rich material of the group consisting of silicon and ferrosilicon containing from about 40% up to about 98% silicon, which comprises treating a molten body of said material with an oxidizing agent, at least 50% of the oxygen content of said oxidizing agent being in the form of carbon dioxide.

2. The method of removing aluminum and calcium from silicon-rich material of the group consisting of silicon and ferrosilicon containing from about 40% up to about 98% silicon, which comprises injecting into a molten body of said material an oxidizing gas, at least 50% of the oxygen content of said oxidizing gas being in the form of carbon dioxide.

3. The method of removing aluminum and calcium from silicon-rich material of the group consisting of silicon and ferrosilicon while simultaneously lowering the carbon content of the silicon-rich material containing from about 40% up to about 98% silicon, which comprises treating a molten body of said material with an oxidizing agent, at least 50% of the oxygen content of said oxidizing agent being in the form of carbon dioxide.

4. The method of removing aluminum and calcium from silicon-rich material of the group consisting of silicon and ferrosilicon while simultaneously lowering the carbon content of the silicon-rich material containing from about 40% up to about 98% silicon, which comprises injecting into a molten body of said material an oxidizing gas, at least 50% of the oxygen content of said oxidizing gas being in the form of carbon dioxide.

References Cited in the file of this patent

FOREIGN PATENTS 1,088,325     France _____ Mar. 7, 1955